(12) United States Patent
Bodin et al.

(10) Patent No.: US 7,868,507 B2
(45) Date of Patent: Jan. 11, 2011

(54) PHASE WINDING FOR A ROTATING ELECTRICAL MACHINE STATOR AND STATOR EQUIPPED WITH SAME

(75) Inventors: Denis Bodin, Saint Martin Boulogne (FR); Jean-Pierre Chochoy, Cremarest (FR); Alain Defebvin, Cormont (FR); Michel Jaze, Frencq (FR)

(73) Assignee: Valeo Equipements Electriques Moteur, Creteil (FR)

( * ) Notice: Subject to any disclaimer, the term of this patent is extended or adjusted under 35 U.S.C. 154(b) by 11 days.

(21) Appl. No.: 11/993,143

(22) PCT Filed: Jun. 15, 2006

(86) PCT No.: PCT/FR2006/050563

§ 371 (c)(1),
(2), (4) Date: Mar. 18, 2010

(87) PCT Pub. No.: WO2007/003834

PCT Pub. Date: Jan. 11, 2007

(65) Prior Publication Data

US 2010/0164318 A1 Jul. 1, 2010

(30) Foreign Application Priority Data

Jun. 30, 2005 (FR) .................................. 05 51842

(51) Int. Cl.
*H02K 3/04* (2006.01)
(52) U.S. Cl. .................................. 310/208
(58) Field of Classification Search ................ 310/208; 130/179; 29/596
See application file for complete search history.

(56) References Cited

U.S. PATENT DOCUMENTS

| | | | |
|---|---|---|---|
| 4,857,787 A | 8/1989 | Taji et al. | |
| 4,908,541 A | 3/1990 | Kawazoe et al. | |
| 5,113,573 A * | 5/1992 | Taji et al. | 29/596 |
| 6,166,461 A | 12/2000 | Kusase et al. | |
| 6,515,393 B2 * | 2/2003 | Asao et al. | 310/184 |
| 6,614,141 B2 | 9/2003 | Oohashi et al. | |
| 6,750,582 B1 | 6/2004 | Neet | |
| 6,787,961 B2 | 9/2004 | Neet et al. | |
| 6,858,963 B2 | 2/2005 | Neet | |

(Continued)

FOREIGN PATENT DOCUMENTS

FR 2819118 A1 7/2002

(Continued)

*Primary Examiner*—Nguyen N Hanh
(74) *Attorney, Agent, or Firm*—Jacox, Meckstroth & Jenkins

(57) ABSTRACT

A rotating electrical machine stator comprising an annular cylindrical body including axial grooves, and at least one phase winding including corrugated turns of wire, the phase winding comprising a first outer half-phase and a second inner half-phase which are radially superimposed, the first outer half-phase including outer leading-out wires projecting from the radial walls of the body and the second inner half-phase including outer leading-out wires projecting from the radial walls of the body. The invention is characterized in that for each phase winding, the wire length of each turn of the inner half-phase is greater than the wire length of each turn of the outer half-phase. The invention also concerns a phase winding designed to be mounted in such a rotor.

18 Claims, 5 Drawing Sheets

U.S. PATENT DOCUMENTS

| | | |
|---|---|---|
| 7,224,093 B2 | 5/2007 | Abadia et al. |
| 7,246,428 B2 * | 7/2007 | Fukasaku et al. ............... 29/605 |
| 2002/0079772 A1 | 6/2002 | Oohashi et al. |
| 2002/0158523 A1 | 10/2002 | Abadia et al. |
| 2004/0119360 A1 | 6/2004 | Neet |
| 2004/0119361 A1 | 6/2004 | Neet et al. |
| 2004/0135458 A1 | 7/2004 | Neet |
| 2005/0168095 A1 * | 8/2005 | Tanimoto et al. ............ 310/208 |
| 2005/0258704 A1 * | 11/2005 | Oohashi et al. ............. 310/216 |

FOREIGN PATENT DOCUMENTS

| | | |
|---|---|---|
| FR | 2846481 A1 | 4/2004 |
| WO | 0169762 A1 | 9/2001 |

* cited by examiner

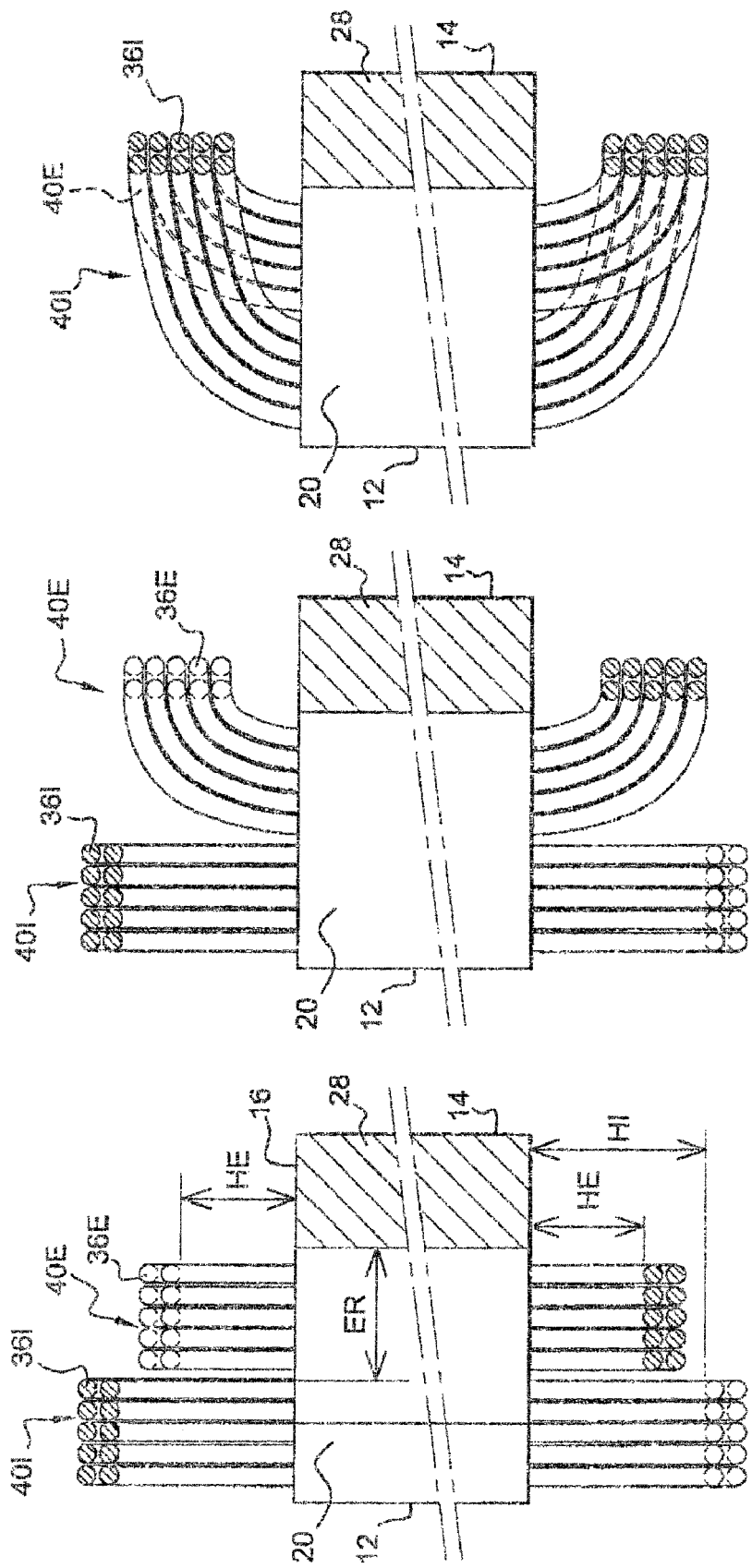

PHASE WINDING FOR A ROTATING ELECTRICAL MACHINE STATOR AND STATOR EQUIPPED WITH SAME

BACKGROUND OF THE INVENTION

1. Field of the Invention

The invention relates to a stator of a rotary electric machine which comprises a plurality of phase windings.

The invention relates more particularly to a stator of a rotary electric machine, in particular an alternator or alternator-starter for a motor vehicle, comprising:

an annular cylindrical body comprising axial slots which open axially into the front and rear axial end walls of the body and which are open radially into the inner cylindrical wall of the body;

at least one phase winding which comprises corrugated turns of wire which comprise a series of axial strands which are received in a series of associated slots and connecting strands which connect the successive axial strands by protruding alternately with respect to the rear axial end wall and with respect to the front axial end wall;

at least one phase winding comprises a first outer half-phase forming a first outer layer of turns which is received in the bottom of the slot, and a second inner half-phase forming a second inner layer of turns which are radially superposed, the connecting strands of the first outer half-phase forming outer coil ends and the connecting strands of the second inner half-phase forming inner coil ends, the inner and outer coil ends protruding axially with respect to the front and rear axial end walls of the body.

2. Description of the Related Art

The stators are already known in particular from the document FR-A-2.819.118.

In general, the number of slots on a stator is equal to three times the number of phase windings multiplied by the number of poles of the rotor.

Thus, for a stator which comprises three phase windings, known as a "three-phase" stator, and which comprises twelve poles, the body of the stator comprises thirty-six slots, and each phase winding is received in a series of twelve slots. Two consecutive slots of a series are arranged in such a way as to have between them two adjacent free slots, each free slot belonging to another series of slots which is associated with another phase.

When mounting each phase winding in the body of the stator, the axial strands of each phase winding are inserted in the slots of the associated series of slots via the open axial grooves in the inner cylindrical wall of the stator body.

The insertion of each phase winding must not be hampered by the coil ends of the other phase windings. The coil ends are therefore pushed radially outwards so as to free up some space axially opposite the open orifices of the slots in the axial end walls.

However, some stators have a body which comprises a greater number of slots, each of which is of reduced size.

This is the case with three-phase stators comprising sixteen poles. The body of the stator then comprises forty-eight slots.

This is also the case with a stator comprising six phase windings, known as a "six-phase" stator. In this type of stator, the transverse width of the slots is essentially divided by two compared to the slots of a three-phase stator of the same diameter with twelve poles.

Furthermore, the number of coil ends is multiplied by two. It therefore becomes difficult to insert a phase winding without being hampered by the coil ends of the other phase windings.

SUMMARY OF THE INVENTION

The invention therefore proposes a stator comprising for each phase winding, the length of wire of each turn of the inner half-phase is greater than the length of wire of each turn of the outer half-phase, such that the protruding axial height of the inner coil ends is greater than the protruding axial height of the outer coil ends.

According to other features of the invention:

the protruding axial height of the inner coil ends and of the outer coil ends is such that the coil ends are able to be folded radially towards the outer periphery of the stator body so as to free the open axial ends of the intermediate slots which do not form part of the series of slots associated with said winding;

the protruding axial height of the outer coil ends is substantially equal to the axial height of the inner coil ends plus a height that is generally equal to the radial thickness occupied by the axial strands of the outer half-phase in each associated slot;

the turns of each half-phase are oppositely corrugated;

the stator comprises six phase windings, and two successive slots of each series being spaced apart by five adjacent intermediate slots; and the stator comprises three phase windings, and two successive slots of each series being spaced apart by two adjacent slots.

The invention also relates to a phase winding which is designed to be mounted by axial deformation on a stator body so as to obtain a stator according to the teachings of the invention, of the type in which the phase winding comprises an axial superposition of turns in the form of regular stars, each turn comprising radial strands of equal length and inner and outer transverse connecting strands, of the type in which the radial strands are designed to be received in the axial slots of the stator body so as to form the axial strands of the mounted winding, while the transverse connecting strands are designed to form the coil ends of the mounted winding, and of the type in which the phase winding comprises a first rear half-phase forming a rear layer of turns, and a second front half-phase forming a front layer of turns, the front half-phase being designed to form the outer half-phase of the mounted winding and the rear half-phase being designed to form the inner half-phase of the mounted winding, characterized in that the length of wire of each turn of the rear half-phase is greater than the length of wire of each turn of the front half-phase.

According to other features of the phase winding according to the invention:

the length of wire of each turn of the rear half-phase is 2% to 10% greater than the length of wire of each turn of the front half-phase;

the length of wire of each turn of the rear half-phase is generally equal to the length of wire of each turn of the front half-phase plus the axial thickness of the front half-phase multiplied by the number of radial strands;

the length of each radial strand of each turn of the rear half-phase is equal to the length of a radial strand of one of the turns of the front half-phase plus the axial thickness of the rear half-phase;

the star-shaped contour of the front half-phase is offset angularly about the central axis with respect to the star-shaped contour of the rear half-phase, so that the branches of the upper star extend radially between two branches of the lower star;

the two half-phases are wound in an opposite direction with respect to one another.

BRIEF DESCRIPTION OF THE DRAWINGS

Other features and advantages of the invention will become apparent upon reading the following detailed description, for the comprehension of which reference will be made to the appended drawings, in which:

FIG. 12 is a sectional view along the section plane 12-12 in FIG. 11 which shows two coil ends of the phase winding before they have been pushed back radially towards the outside;

FIG. 13 is a view similar to that of FIG. 12 in which one of the coil ends has been pushed back radially towards the outside; and FIG. 14 is a view similar to that of FIG. 7 in which the two coil ends have been pushed back radially towards the outside

DESCRIPTION OF THE PREFERRED EMBODIMENTS

Figure 1:
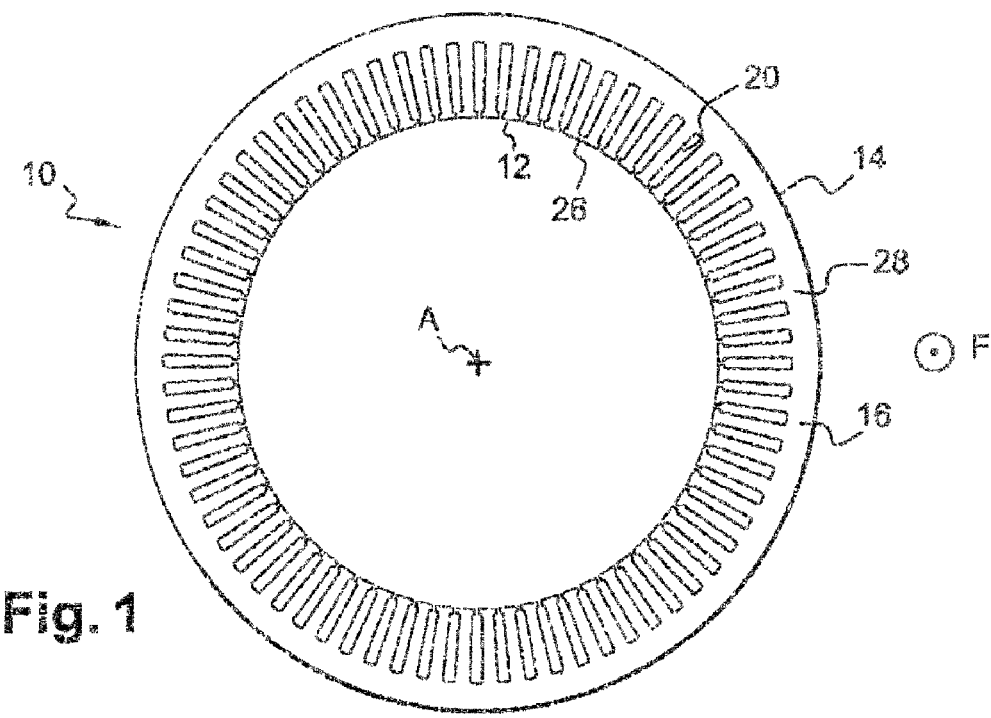
FIG. 1 is a plan view which shows a stator body that is already known which is designed to receive phase windings.

In the text below, elements which are identical, similar or analogous will be designated by the same reference numerals.

For the rest of the description, and in a non-limiting manner, there will be adopted an axial orientation which is aimed from the back towards the front as indicated by the arrow F in the figures.

Figure 2:
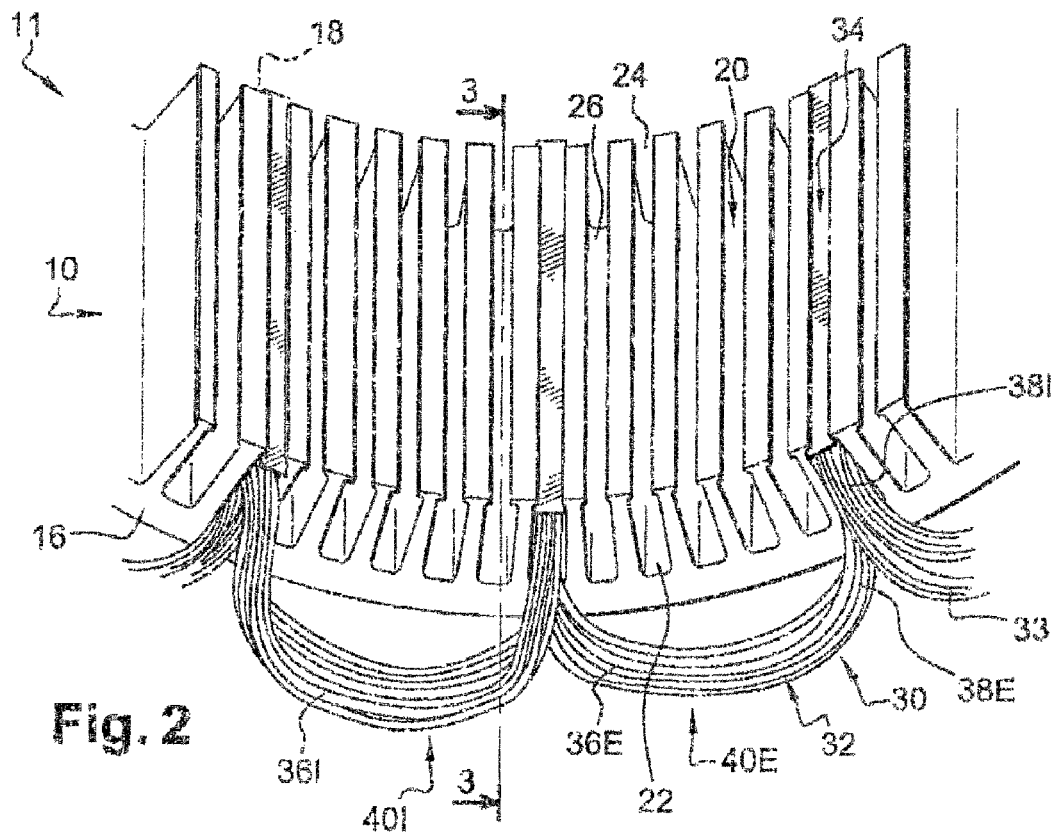
FIG. 2 is a perspective view on a large scale which shows a sector of the stator body of FIG. 1 in which a phase winding formed according to the prior art has been mounted.

FIG. 2 shows a rotary electric machine stator 11 formed according to the prior art which comprises principally a stator body 10 in which a plurality of phase windings 30 are mounted.

In order to simplify the comprehension of the figures, the stator 11 has been shown with a single phase winding 30, but such a stator 11 comprises six phase windings which are analogous to the one shown in FIG. 2.

FIG. 1 shows the stator body 10 of the rotary electric machine stator 11. The rotary machine is for example an alternator or an alternator-starter. This machine is preferably intended to be used in a motor vehicle.

It will be recalled that an alternator-starter is a rotary electric machine which is able to operate in a reversible manner, on the one hand as an electric generator in an alternator function and on the other hand as an electric motor in particular for starting the heat engine of the motor vehicle. Such an alternator-starter is described for example in the document WO-A-01/69762 corresponding to U.S. Pat. No. 7,224,093, to which reference may be made for further details and which is incorporated herein by reference and made a part thereof.

The stator body 10 has an annular cylindrical shape of axis A.

In the rest of the text, orientations which are orthogonal to the axis A and secant with the axis A will be referred to as radial orientations. Orientations which are orthogonal both to the axis A and to a radial orientation will be referred to as transverse orientations.

The stator body 10 is delimited radially by an inner cylindrical wall 12 and by an outer cylindrical wall 14, and it is delimited axially by a radial front axial end wall 16 and by a radial rear axial end wall 18.

The stator body 10 comprises axial slots 20 which open axially into the radial front 12 and rear 14 axial end walls of the stator body 10 via front 22 and rear 24 axial orifices.

The transverse width of the slots 20 is smaller than the radial length thereof.

The slots 20 are open radially into the inner cylindrical wall 12 of the stator body 10 via an axial groove 26 which extends from the radial front axial end wall 16 to the radial rear axial end wall 18. The transverse width of each axial groove 26 is smaller than the width of the associated slot 20.

The slots 20 are all identical, and there are seventy-two of them for example. They are distributed at regular angular intervals about the axis A of the stator body 10.

The solid outer annular portion of the stator body 10, in which the slots 20 do not extend, is referred to as the yoke 28.

As shown in FIG. 2, in order to form the stator 11, phase windings 30 are mounted in the stator body 10.

The invention will be described with reference to a stator comprising six phase windings 30, also known as a "six-phase" stator.

However, the invention is applicable to stators comprising a different number of phase windings, and in particular to "three-phase" stators comprising three phase windings 30. The stator body 10 then comprises for example thirty-six or forty-eight slots 20.

Each phase winding 30 comprises corrugated turns 32 formed by an electrically conductive wire 33.

According to one variant of the invention, each phase winding 30 comprises corrugated turns 32 which are formed by a bundle of at least two conductive wires.

Thus, as shown in FIG. 2, each phase winding 30 comprises corrugated turns 32 of wire 33 which comprise a series of axial strands 34 which are received in a series of associated slots 20.

Connecting strands 36 of generally transverse orientation which connect the successive axial strands 34 protrude alternately with respect to the radial rear axial end wall 18 and with respect to the radial front axial end wall 16.

As shown in FIG. 2, the slots 20 of the series of slots receive the axial strands 34 of the turns 32 constituting a phase winding 30. Each axial strand 34 is able to be introduced into the associated slot 20 via the axial groove 26, as will be described below.

Each series of slots is associated with one of the six phase windings 30. Two consecutive slots 20 of a series of slots 20 are separated by adjacent slots 20, each corresponding to another series of slots 20 which is associated with one of the five other phase windings 30.

Thus, for a six-phase stator as is the case in FIG. 2, five adjacent slots are left free between two slots 20 of each series. In other words, the wires 33 of one winding are inserted in one slot 20 out of six adjacent slots 20.

Thus, for a stator comprising N phase windings 30, the axial strands 34 of a turn 32 are received in one slot 20 out of N adjacent slots 20.

Each phase winding 30 of the stator 11 comprises a first outer half-phase 38E forming a first outer layer of turns 32 and a second inner half-phase 38I forming a second inner layer of turns 32. The axial strands 34 of the outer half-phase 38E are superposed radially with the axial strands 34 of the inner half-phase 38I, as shown in FIG. 2.

The connecting strands 36E of the first outer half-phase 38E form outer coil ends 40E and the connecting strands 36I of the second inner half-phase 38I form inner coil ends 40I. The inner 40I and outer 40E coil ends protrude axially with respect to the front 16 and rear 18 axial end walls of the stator body 10.

The coil ends 40I of the inner half-phase 38I extend in an axial direction alternately from the front 16 and rear 18 radial walls of the stator body 10, thus forming front and rear first annuli.

The coil ends of the outer half-phase 38E extend in an axial direction alternately from the front 16 and rear 18 radial walls of the stator body 10, thus forming front and rear second annuli.

The two half-phases 38E, 38I are oppositely corrugated. Thus, the second annuli have a smaller diameter than the first annuli, and they are offset angularly with respect to these first annuli about the axis A.

This type of phase winding 30 is also known by the name "distributed wave winding".

Figure 3:
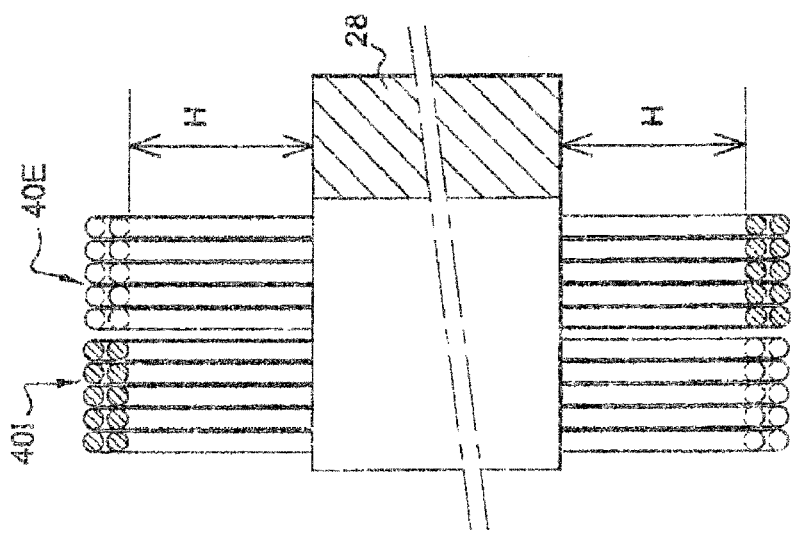
FIG. 3 is a sectional view along the section plane 3-3 in FIG. 2 which shows two coil ends of the phase winding before they have been pushed back radially.

As shown in FIG. 3 and in a known manner, each of the coil ends 40E, 40I of each half-phase 38E, 38I protrudes with respect to the front 16 or rear 18 radial wall by a substantially equal axial height H.

For the rest of the description, the axial height H of a coil end 40E, 40I will be described as the axial distance between the radial wall of the stator body 10 from which the coil end 40E, 40I extends axially and the most remote point of the inner arch formed by the coil end 40I, 40E.

A known method for inserting the phase windings 30 in the stator body 10 is briefly described below. A detailed description of such an insertion method is described in detail for example in the document FR-A-2.846.481, in particular in pages 8 to 11 of this document.

In order to distinguish a phase winding before mounting on the stator body 10 from a phase winding mounted on the stator body 10, the reference winding before mounting will have the reference numeral 50 whereas the same phase winding in the mounted state will have the reference numeral 30.

Figure 4:
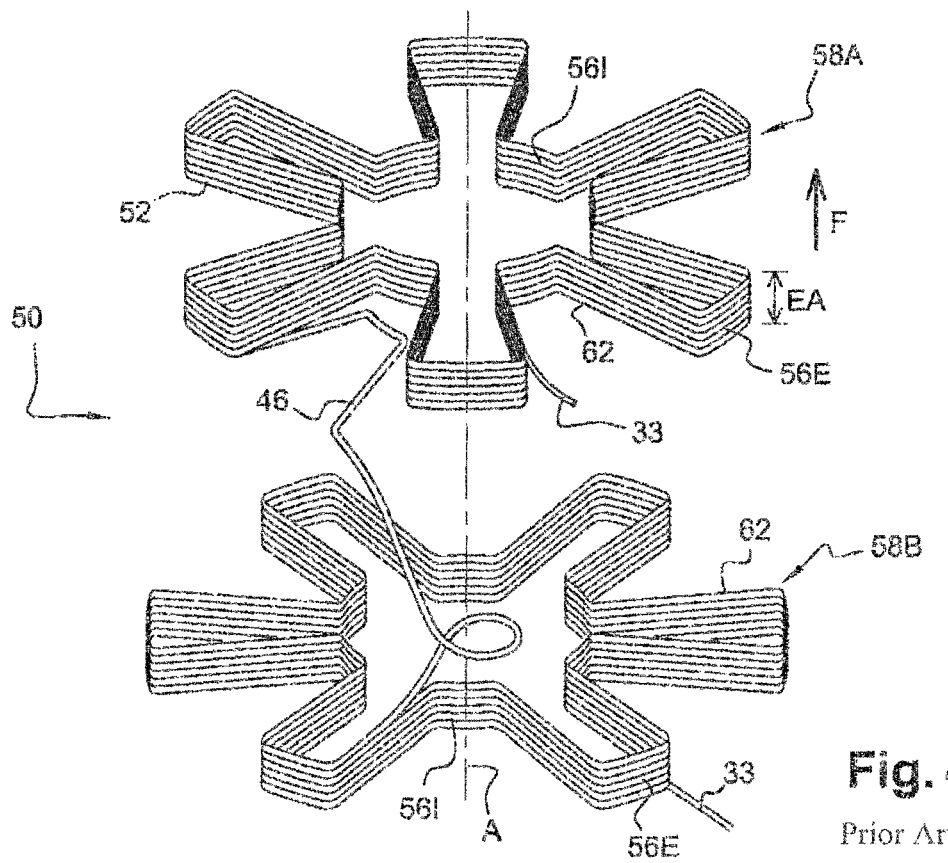
FIG. 4 is a perspective view which shows the phase winding of FIG. 2 before it is mounted on the stator body of FIG. 1 which is in accordance with the prior art.

FIG. 4 shows a phase winding 50 before being mounted in the slots 20 of the stator body 10. This non-mounted phase winding 50 is already known and makes it possible to obtain a known stator 11 as described above.

Here, the non-mounted phase winding 50 is made from an electrically conductive wire 33, such as a copper wire. The phase winding 50 has an axis which is coaxial with the axis A of the stator body 10.

This non-mounted phase winding 50 comprises front 58A and rear 58B half-phases which are shown in FIG. 3. These front 58A and rear 58B half-phases correspond respectively to the outer 38E and inner 38I half-phases of the mounted phase winding 30.

Each half-phase 58A, 58B comprises a superposition of identical flat turns 52 in the form of regular stars of axis A. The turns 52 of a given half-phase 58A, 58B superpose one another perfectly.

As shown in FIG. 3, the turns 52 of the front half-phase 58A are wound in a first, clockwise direction while the turns 52 of the rear half-phase 58B are wound in a second, anti-clockwise direction.

Each turn 52 of a half-phase 58A, 58B comprises a plurality of radial strands 62 of equal length which are oriented substantially radially with respect to the axis A. There is an even number of radial strands 62, and more particularly here there are twelve of them.

The radial strands 62 are connected alternately to one another by inner 56I and outer 56E transverse connecting strands in such a way that pairs of two successive radial strands 62 form the branches of a regular star which here has six branches.

The radial strands 62 are designed to constitute the axial strands 34 of the mounted phase winding 30, whereas the inner 56I and outer 56E transverse strands are designed to constitute the transverse strands 36E, 36I of the coil ends 40E, 40I of the mounted phase winding 30.

Figure 5:
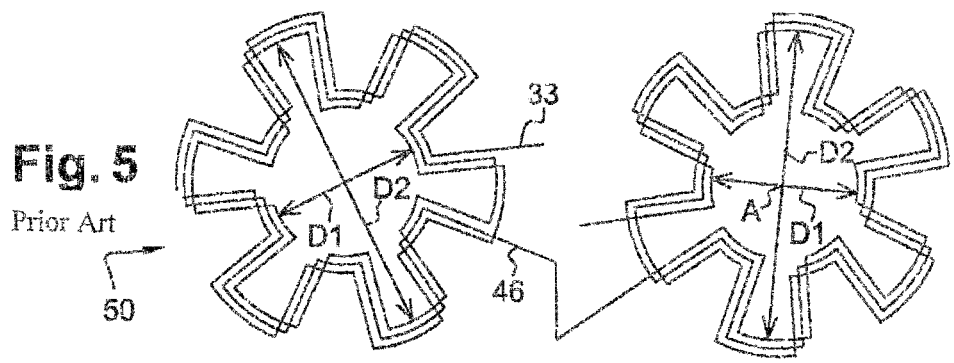
FIG. 5 is an exploded plan view which shows the two half-phases of the phase winding of FIG. 2 before mounting which is in accordance with the prior art.

As shown in FIG. 5, the radial length of the radial strands 62 is substantially greater than the axial length of each slot 20 of the stator body 10.

The inner transverse strands 56I extend on an imaginary inner circle which is centered on the axis A and which has a diameter D1 that is substantially smaller than the inner diameter of the stator body 10.

The outer transverse strands 56E extend generally on an imaginary outer circle which is centered on the axis A and which has a diameter D2 that is substantially greater than the inner diameter of the stator body 10.

The two half-phases 58A, 58B are electrically connected to one another by a connecting wire 46.

Advantageously, the two half-phases 58A, 58B and the connecting wire 46 consist of a single wire 33 or of a single bundle of at least two parallel wires.

Figure 6:
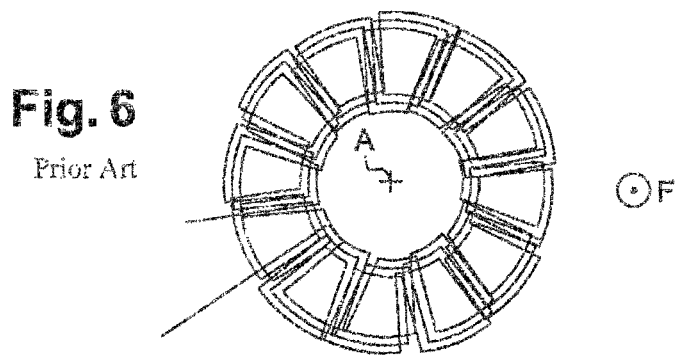
FIG. 6 is a plan view which shows the phase winding according to the prior art in which the two half-phases are axially superposed.

As shown in FIG. 6, the front half-phase 58A is placed in front of the rear half-phase 58B. The axes of symmetry of the two half-phases 58A, 58B are coaxial with the axis A of the stator body 10, such that the front half-phase 58A is offset axially towards the front relative to the rear half-phase 58B.

The rear half-phase 58B thus forms a rear layer of turns 52 while the front half-phase 58A forms a front layer of turns 52.

As shown in FIG. 6, the turns 52 of the front half-phase 38Ea are offset angularly about the axis A relative to the turns 32a of the rear half-phase 38Ia, each branch of the front half-phase 38Ea thus being inserted angularly between two branches of the rear half-phase 38Ia.

This phase winding 50 is then mounted by deformation on the stator body 10 using the mounting method which comprises in particular the following steps.

During a first positioning step, the phase winding 50 is arranged against the radial rear axial end wall 18 of the stator body 10, the star-shaped turns 52 being coaxial to the axis A of the stator body 10 and extending in planes which are substantially perpendicular to this axis A.

The front half-phase 58A is positioned closer to the radial rear axial end wall 18 than the rear half-phase 58B. A portion of each radial strand 62 of the turns 52 is arranged opposite an associated slot 20.

During a second step of insertion via deformation, the front 58A and rear 58B half-phases are inserted in the slots 20 by progressively twisting the radial strands 62 of the turns 52 axially from the back to the front and by simultaneously tilting all the radial strands 62 towards a direction parallel to the axis A.

This deformation is obtained for example by making an insertion block (not shown) slide axially from the back to the front inside the stator body 10 so that, during its sliding movement, the insertion block presses against the inner transverse strands 54I in order to cause the tilting of the radial strands 62.

The radial strands 62 of each turn 52 initially extend in a radial plane perpendicular to the axis A. During the tilting thereof, each radial strand 62 is inserted in the slot 20 located opposite via the axial groove 26.

The radial strands 62 are then inserted in the slots 20 over almost their entire length. In the mounted position in the stator body 10, the radial strands 62 then have an axial orientation. These radial strands 62 then correspond to the axial strands 34 of the stator 11.

The axial strands 34 of the outer half-phase 38E, corresponding to the radial strands 62 of the front half-phase 58A, are then arranged radially at the bottom of each slot 20, close to the yoke 28 of the stator body 10, while the axial strands 34 of the inner half-phase 38I, corresponding to the axial strands 62 of the rear half-phase 58B, are arranged radially close to the axial groove 26.

Similarly, the inner transverse strands 56I of the turns 52 then form the coil ends 40E, 40I which protrude with respect to the radial front axial end wall 16 of the stator body 10, and the outer transverse strands 56E of the turns 52 then form the coil ends 40E, 40I which protrude with respect to the radial rear axial end wall 18 of the stator body 10.

The mounting steps are then repeated for the other phases of the stator.

Figure 8:
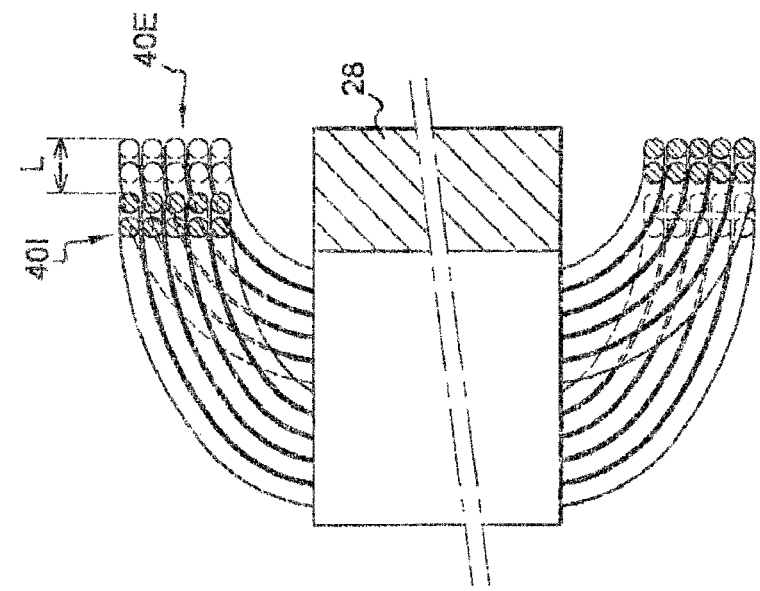
FIG. 8 is a view similar to that of FIG. 3 in which the outer and inner coil ends have been pushed back radially against the yoke of the stator body.
Figure 7:
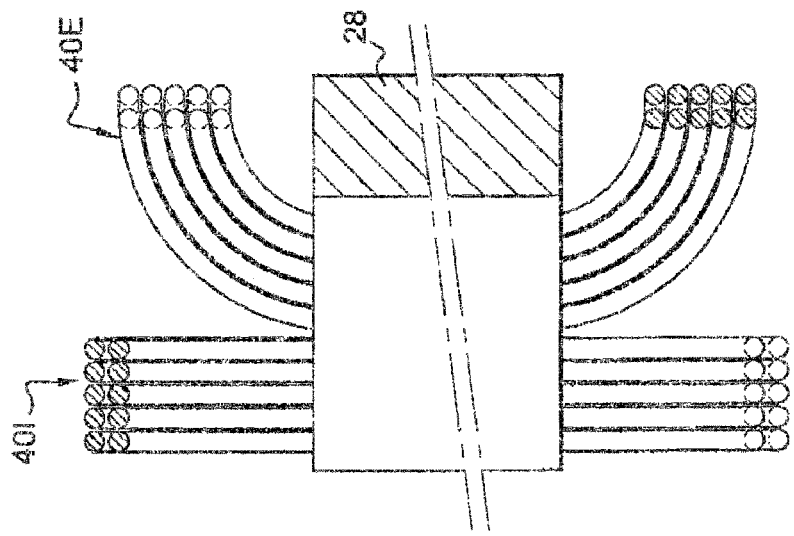
FIG. 7 is a view similar to that of FIG. 3 in which the outer coil end has been pushed back radially against the yoke of the stator body.

As shown in FIGS. 7 and 8, in order to allow the insertion of the other phases, the coil ends 40E, 40I of the mounted phase winding 30 are pushed back radially towards the outside in order to free the axial orifices 22, 24 of the free slots 20 which do not form part of the series of slots 20 associated with this phase winding 30.

The loops of the coil ends 40E, 40I then extend in a plane which is substantially radial with respect to the axis A, so as to frame the axial orifices 22, 24 of the slots 20 in the two transverse directions and in a radial direction towards the outside.

This operation makes it possible to free the axial orifices 22, 24 of the slots 20 so as not to hamper the insertion of the other phases, and in particular so as not to interfere with the coil ends 40E, 40I of the other phases.

However, before being pushed back, the outer coil ends 40E have substantially the same axial height as the inner coil ends 40I. Part of the axial height H of the outer coil ends 40E is therefore superfluous, that is to say that in the pushed-back position, as shown in FIGS. 7 and 8, the outer coil ends 40E protrude radially by a length L with respect to the inner coil ends that have been pushed back radially. This means an unnecessary use of wire and an unnecessary bulk of the outer coil ends 40E.

The invention therefore proposes a phase winding 30 which, when it is mounted in the stator body 10, makes it possible to obtain a stator 11 in which the axial height of the outer coil ends 40E is smaller than the axial height of the inner coil ends 40I.

In order to obtain such a stator, the invention proposes a non-mounted phase winding 50 in which the length of wire 33 of each turn 52 of the rear half-phase 58B is greater than the length of wire 33 of each turn 52 of the front half-phase 58A.

Figure 9:
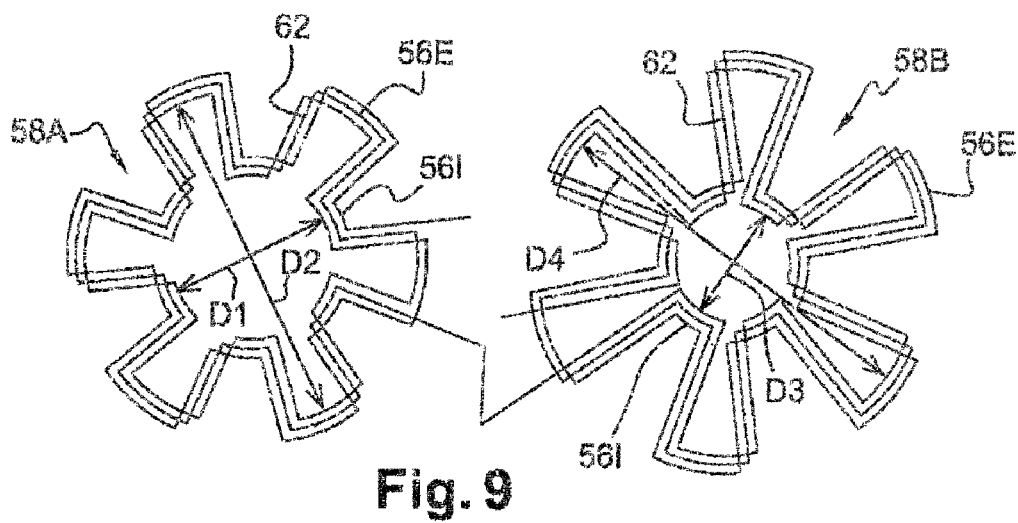
FIG. 9 is an exploded plan view which shows the two half-phases of a phase winding before mounting in the stator body of FIG. 1 which is formed according to the teachings of the invention.
Figure 10:
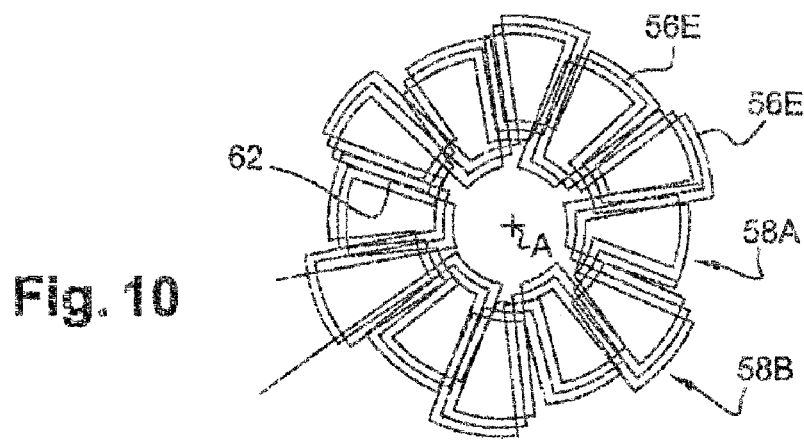
FIG. 10 is a plan view which shows the winding of FIG. 9 in which the two half-phases are axially superposed.

Thus, FIGS. 9 and 10 show a phase winding 50 before it is mounted in the stator body 10. This non-mounted phase winding 50 is formed according to the teachings of the invention.

For each half-phase 58A, 58B, the radial strands 62 have an identical length. However, the radial strands 62 of the rear half-phase 58B are longer than the radial strands 62 of the front half-phase 58A.

More particularly, the length of the radial strands 62 of the rear half-phase 58B is such that the inner transverse strands 56I of the rear half-phase 58B are arranged on an inner circle centered on the axis A, the diameter D3 of which is smaller than the diameter D1 of the inner circle on which there extend the inner transverse strands 56I of the front half-phase 58A.

Furthermore, the outer transverse strands 56E of the rear half-phase 58B are arranged on a circle centered on the axis A, the diameter D4 of which is greater than the diameter D2 of the circle on which there extend the outer transverse strands 56E of the front half-phase 58A.

Thus, as shown in FIG. 10, the radial strands 62 of the rear half-phase 58B protrude radially inwards and outwards with respect to the radial strands 62 of the front half-phase 58A.

More particularly, the length of the radial strands 62 of the rear half-phase 58B of the phase winding 30 is here equal to the length of the radial strands 62 of the front half-phase 38E plus the radial thickness ER that the axial strands 34 will occupy in an associated slot 20 when the phase winding 50 is mounted in the stator body 10.

This radial thickness ER corresponds generally to the axial thickness EA occupied by the radial strands 62 of the front half-phase 58A of the phase winding 50 before it is mounted in the stator body 10.

In other words, the length of wire 33 of each turn 52 of the rear half-phase 58B is generally substantially equal to the length of wire 33 of each turn 52 of the front half-phase 58A plus the axial thickness of the front half-phase 58A multiplied by the number of radial strands 62.

For example, the length of wire 33 of each turn 52 of the rear half-phase 58B is 2% to 10% greater than the length of wire of each turn 52 of the front half-phase 58A.

As shown in FIG. 13, when a phase winding 50 formed according to the teachings of the invention is mounted on the stator body 10, the inner coil ends 40I have an axial height HI which is greater than the axial height HE of the outer coil ends 40E. This greater axial height HE of the outer coil end 40E is conferred by the greater length of the axial strands 34 of the inner half-phase 38I.

As shown in FIG. 13, the axial height HE of the outer coil end 40E is such that the transverse strands 36I of the inner half-phase 38I extend in alignment with the yoke 28 of the stator body 10, substantially on the same circle as the transverse strands 36E of the outer half-phase 38E.

In order to obtain this result, the axial height HI of the inner coil ends 40I is equal to the axial height of the outer coil ends 40E plus substantially the radial thickness occupied by the axial strands 34 of the outer half-phase 38E in each associated slot 20.

Figure 11:
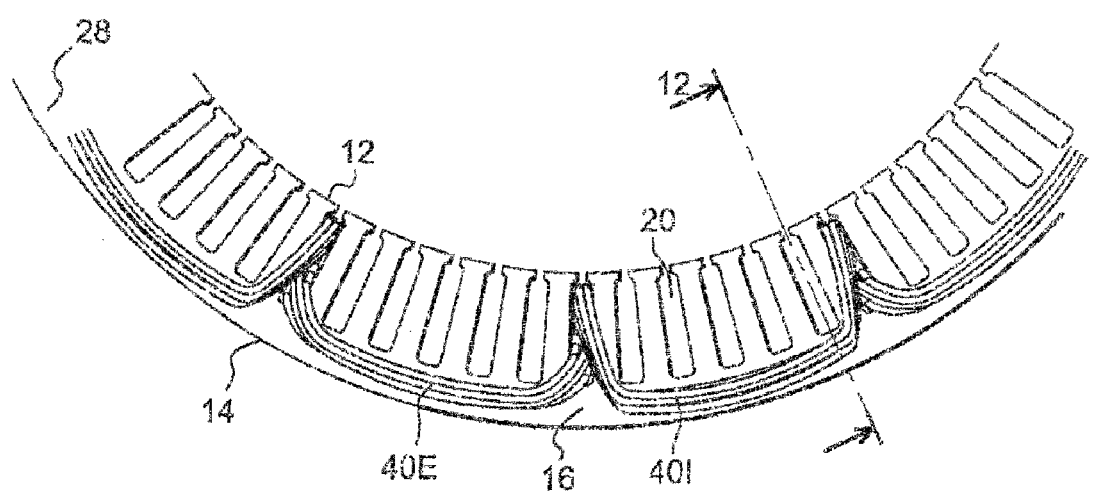
FIG. 11 is a plan view which shows a sector of a stator body in which the winding of FIG. 10 has been mounted and in which the coil ends of the phase winding have been pushed back radially towards the outside.

Thus, when the coil ends 40E, 40I are pushed back radially towards the outside, as shown in FIG. 11 and also in FIGS. 13 and 14, the slots 20 are perfectly freed, but none of the coil ends 40E, 40I protrudes radially outwards from the stator body 10. More specifically, the coil ends 40E and 40I are at the same radial distance from the slots 20.

Thus, the outer coil end 40E has an axial height such that, when it is pushed back radially, as shown in FIG. 8, the coil end 40E is arranged axially in alignment with the yoke 28 of the stator body 10, thereby freeing the space which extends axially in front of the free slots 20 of the front radial wall.

The invention has been described with reference to a method in which the phase windings 30a are mounted successively one after the other in the stator body 10. However, the invention is also applicable for mounting methods in which at least two phase windings 30a, or even all the phase windings 30a, are mounted simultaneously in the stator body 10.

While the form of apparatuses herein described constitute preferred embodiments of this invention, it is to be understood that the invention is not limited to these precise forms of apparatuses, and that changes may be made therein without departing from the scope of the invention which is defined in the appended claims.

What is claimed is:

1. A stator of a rotary electric machine, in particular an alternator or alternator-starter for a motor vehicle, comprising:
    an annular cylindrical body comprising axial slots which open axially into the front and rear axial end walls of the body and which are open radially into the inner cylindrical wall of the body;
    at least one phase winding which comprises corrugated turns of wire which comprise a series of axial strands which are received in a series of associated slots and connecting strands which connect the successive axial strands by protruding alternately with respect to the rear axial end wall and with respect to the front axial end wall; and
    at least one phase winding comprises a first outer half-phase forming a first outer layer of turns which is received in the bottom of the slot, and a second inner half-phase forming a second inner layer of turns which are radially superposed, the connecting strands of the first outer half-phase forming outer coil ends and the connecting strands of the second inner half-phase forming inner coil ends, the inner and outer coil ends protruding axially with respect to the front and rear axial end walls of the body;
    wherein for each phase winding, the length of wire of each turn of the inner half-phase is greater than the length of wire of each turn of the outer half-phase, such that the protruding axial height of the inner coil ends is greater than the protruding axial height of the outer coil ends.

2. The stator according to claim 1, wherein the protruding axial height of the inner coil ends and of the outer coil ends is such that the coil ends are able to be folded radially towards the outer periphery of the stator body so as to free the open axial ends of the intermediate slots which do not form part of the series of slots associated with said winding.

3. The stator according to claim 1, wherein the protruding axial height of the outer coil end is substantially equal to the axial height of the inner coil ends plus a height that is generally equal to the radial thickness occupied by the axial strands of the outer half-phase in each associated slot.

4. The stator according to claim 1, wherein the turns of each half-phase are oppositely corrugated.

5. The stator according to claim 1, which comprises six phase windings, and in that two successive slots of each series are spaced apart by five adjacent intermediate slots.

6. The stator according to claim 1, which comprises three phase windings, and in that two successive slots of each series are spaced apart by two adjacent slots.

7. A phase winding which is designed to be mounted by axial deformation on a stator body so as to obtain a stator according to claim 1, of the type in which the phase winding comprises an axial superposition of turns in the form of regular stars, each turn comprising radial strands of equal length and inner and outer transverse connecting strands, of the type in which the radial strands are designed to be received in the axial slots of the stator body so as to form the axial strands of the mounted winding, while the transverse connecting strands are designed to form the coil ends of the mounted winding, and of the type in which the phase winding comprises a first rear half-phase forming a rear layer of turns, and a second front half-phase forming a front layer of turns, the front half-phase being designed to form the outer half-phase of the mounted winding and the rear half-phase being designed to form the inner half-phase of the mounted winding,
    wherein the length of wire of each turn of the rear half-phase is greater than the length of wire of each turn of the front half-phase.

8. The phase winding according to claim 7, wherein the length of wire of each turn of the rear half-phase is generally equal to the length of wire of each turn of the front half-phase plus the axial thickness of the front half-phase multiplied by the number of radial strands.

9. The phase winding according to claim 7, wherein the star-shaped contour of the front half-phase is offset angularly about the central axis with respect to the star-shaped contour of the rear half-phase, so that the branches of the upper star extend radially between two branches of the lower star.

10. The phase winding according to claim 7, wherein the two half-phases are wound in an opposite direction with respect to one another.

11. The phase winding according to claim 1, wherein the length of wire of each turn of the rear half-phase is 2% to 10% greater than the length of wire of each turn of the front half-phase.

12. The phase winding according to claim 1, wherein each radial strand of each turn of the rear half-phase is equal to the length of a radial strand of one of the turns of the front half-phase plus the axial thickness of the rear half-phase.

13. A rotary electric machine comprising:
    a rotor;
    a stator comprising an annular cylindrical body comprising axial slots which open axially into the front and rear axial end walls of the body and which are open radially into the inner cylindrical wall of the body;
    at least one phase winding which comprises turns of wire which comprises turns of wire which comprise a series of axial strands which are received in a series of associated slots and connecting strands which connect the successive axial strands by protruding with respect to the rear axial end wall and with respect to the front axial end wall; and
    at least one phase winding comprises an outer half-phase forming an outer layer of turns which is received in a bottom of the slot, and an inner half-phase forming an inner layer of turns which are radially superposed, the connecting strands of the first outer half-phase forming outer coil ends and the connecting strands of the second inner half-phase forming inner coil ends, the inner and outer coil ends protruding axially with respect to the front and rear axial end walls of the body;

wherein for each phase winding, the length of wire of each turn of said inner half-phase is greater than the length of wire of each turn of said outer half-phase, such that a protruding axial height of the inner coil ends is greater than the protruding axial height of the outer coil ends.

14. The rotary electric machine according to claim 13, wherein the protruding axial height of the inner coil ends and of the outer coil ends is such that the coil ends are able to be folded radially towards the outer periphery of the stator body so as to free the open axial ends of the intermediate slots which do not form part of the series of slots associated with said winding.

15. The rotary electric machine according to claim 13, wherein the protruding axial height of the outer coil end is substantially equal to the axial height of the inner coil ends plus a height that is generally equal to the radial thickness occupied by the axial strands of the outer half-phase in each associated slot.

16. The rotary electric machine according to claim 13, wherein the turns of each half-phase are oppositely corrugated.

17. The rotary electric machine according to claim 13, which comprises six phase windings, and in that two successive slots of each series are spaced apart by five adjacent intermediate slots.

18. The stator according to claim 13, which comprises three phase windings, and in that two successive slots of each series are spaced apart by two adjacent slots.

* * * * *